United States Patent [19]

Murphy

[11] Patent Number: 4,875,467
[45] Date of Patent: Oct. 24, 1989

[54] SUPPORT AND MANEUVERING APPARATUS FOR SOLAR ENERGY RECEIVERS

[75] Inventor: Lawrence M. Murphy, Littleton, Colo.

[73] Assignee: The United States of America as represented by the United States Department of Energy, Washington, D.C.

[21] Appl. No.: 225,444

[22] Filed: Jul. 28, 1988

[51] Int. Cl.⁴ .............................................. F24J 2/38
[52] U.S. Cl. .................................... 126/424; 126/425; 126/438; 126/451; 350/608; 350/611; 350/631; 350/634
[58] Field of Search ............... 126/424, 425, 438, 439, 126/451; 350/600, 607, 608, 611, 626, 631, 633, 634; 353/3; 343/880, 915, 912

[56] References Cited

U.S. PATENT DOCUMENTS

| | | | |
|---|---|---|---|
| 670,916 | 3/1901 | Eneas | 126/438 |
| 3,484,788 | 12/1969 | Bell et al. | 343/880 |
| 3,872,854 | 3/1975 | Raser | 126/425 |
| 3,974,756 | 8/1976 | Long | 98/58 |
| 4,033,676 | 7/1977 | Brantley, Jr. et al. | 126/425 |
| 4,249,515 | 2/1981 | Page | 126/428 |
| 4,340,031 | 7/1982 | Niedermeyer | 126/438 |
| 4,543,945 | 10/1985 | Hattan | 126/438 |
| 4,608,964 | 9/1986 | Russo | 126/438 |

Primary Examiner—James C. Yeung
Attorney, Agent, or Firm—Kenneth Richardson; John M. Albrecht; Judson R. Hightower

[57] ABSTRACT

A support and maneuvering apparatus is disclosed for a solar energy receiving device adpated for receiving and concentrating solar energy and having a central axis extending through the center thereof. The apparatus includes a frame for mounting the perimeter of said solar energy receiving device. A support member extends along the central axis of the receiving device and has a base end passing through the center of the receiving device and an outer distal end adapted for carrying a solar energy receiving and conversion mechanism. A variable tension mechanism interconnects the support member with the frame to provide stiffening for the support member and the frame and to assist in the alignment of the frame to optimize the optical efficiency of the solar energy receiving device. A rotatable base is provided, and connecting members extend from the base for pivotable attachment to the frame at spaced positions therealong. Finally, an elevation assembly is connected to the receiving device for selectively pivoting the receiving device about an axis defined between the attachment positions of the connecting members on the frame.

19 Claims, 4 Drawing Sheets

SUPPORT AND MANEUVERING APPARATUS FOR SOLAR ENERGY RECEIVERS

CONTRACTUAL ORIGIN OF THE INVENTION

The United States Government has rights in this invention under Contract No. DE-AC02-83CH10093 between the United States Department of Energy and the Solar Energy Research Institute, a Division of the Midwest Research Institute.

BACKGROUND OF THE INVENTION

1. Field of the Invention

The present invention relates, generally, to solar energy receiver devices and, more particularly, to solar energy receiver systems utilizing stretched membranes. Specifically, the present invention relates to an improved support and tracking apparatus for stretched membrane solar energy concentrators which reflect the incident solar energy to a receiver mechanism.

2. Description of the Prior Art

In general, conventional solar energy receiver or collector structures are relatively large, having concentrator mirror diameters in the range of to 3-15 meters. The mounting arrangement for supporting such solar concentrators as well as the drive mechanism for steering or maneuvering the concentrators is usually of considerable size and mass. For example, in order for a more conventional, bulkier dish support structure to withstand excessive wind forces, a central pedestal for the drive mechanism and the mirror receiver normally includes a massive metal post to avoid buckling and a massive concrete foundation to prevent uprooting or overturning. In addition, the maneuvering of the solar receiver usually requires costly support shaft bearings and gear drive motors. The production and installation costs for these drive mechanism, pedestals, and foundations represent a large portion of a total cost of central receiver solar power systems that utilize dishes or heliostats. Such costs are a substantial factor in determining the feasibility of utilizing and maintaining such systems. An example of such a complicated and massive structure is illustrated in the solar concentrator system disclosed in U.S. Pat. No. 3,872,854. In addition, a parabolic mirror device utilized as a heating apparatus is also disclosed in U.S. Pat. No. 4,249,515.

More recently, in an attempt to reduce the material, fabrication, and maintenance costs of solar concentrators and their allied structures, solar concentrator mirrors or reflectors have been formed from stretched membranes of polymeric or metallic material. The reflector module usually includes a rim or frame to which a stretched membrane is attached. For optical accuracy, it is necessary that the shape of the frame on which the membrane is attached be rigidly maintained.

One known method of providing support and drive capability for stretched-membrane heliostats and mirrors is through the use of a support spider. The support spider is constructed of cantilevered trusses having first ends attached to the rim of the stretched membranes and opposite ends converging to a junction zone that connects to a drive and support arrangement. However, the connection of a support spider to the rim of the heliostat mirror and to the drive mechanism support pedestal is typically an intricate arrangement that also requires the use of costly support shafts, bearings, and gear drive motors. Moreover, cantilevered structures are not as efficient as either tension structures or well designed compressive structures.

Up to the present time, research efforts have focused on developing the stretched membrane reflector concept and have demonstrated very large reductions in cost and weight for membrane concentrator reflector modules. However, such efforts have typically taken these resultant efficient and low cost reflector modules and integrated them with conventional and expensive support and tracking structures. For example, by placing the stretched membrane module on a conventional center articulated spider truss frame subsystem, which is typical for both dish and heliostat concepts, much of the advantage of stretched membrane reflectors has not been realized. Accordingly, the entire concentrator must be configured as a system to arrive at an optimum design for the stretched membrane concentrator. As the result, there is still a need for support and maneuvering systems for solar energy receivers, and particularly stretched membrane concentrators, which systems are efficient, effective and strong and yet inexpensive to construct and operate.

SUMMARY OF THE INVENTION

Accordingly, it is one object of the present invention to provide a structurally efficient and optically accurate improved solar energy concentrator support and tracking arrangement for stretched membrane concentrators.

It is another object of the present invention to provide an integrated and low cost support and maneuvering apparatus for solar energy concentrating devices.

Yet another object of the present invention is to provide a frame support structure integrated with a stretched membrane reflector which results in a stiff and efficient reflector module structure including azimuthal and elevational tracking systems.

Additional objects, advantages and novel features of the present invention shall be set forth in part in the description that follows, and in part will be come apparent to those skilled in the art upon examination of the foregoing or may be learned by the practice of the invention. The objects and advantages may be realized and attained by means of the instrumentalities and in combinations as particularly pointed out in the appended claim.

To achieve the foregoing and other objects and in accordance with the purpose of the present invention, as embodied and broadly described herein, a support and maneuvering apparatus is provided for a solar energy receiver adapted for receiving and concentrating solar energy and having a central axis extending through the center thereof. The apparatus includes a frame for mounting the perimeter of the solar energy receiver and includes front and rear perimeter edges. A support member extends along the central axis of the receiver and includes a base end passing through the center portion of the receiver and an outer distal end adapted for carrying a solar energy receiving and conversion mechanism. Variable tension means interconnect the support member with the frame to provide stiffening for the support member and frame and to assist in the alignment of the frame to optimize the optical efficiency of the solar energy receiver. A rotatable base member is also provided, and connecting members extend from the base member for pivotal attachment to the frame at spaced positions therealong. Finally, an elevation assembly is connected to the receiver for selectively pivoting the receiver about an axis defined between the attachment positions of the connecting members on the frame.

In one preferred embodiment of the present invention, the variable tension mechanism includes a first variable tension assembly interconnecting the distal end of the support member with the frame means, and a second variable tension assembly which interconnects the base end of the support member with the frame means. The first and second variable tension assemblies interact and cooperate to provide stiffening for the support member and the frame and to assist in the alignment and tensioning of the receiver to optimize its optical efficiency.

BRIEF DESCRIPTION OF THE DRAWINGS

The accompanying drawings which are incorporated in and form a part of the specification illustrate preferred embodiments of the present invention, and together with the description, serve to explain the principles of the invention. In the drawings.

DETAILED DESCRIPTION OF THE PREFERRED EMBODIMENTS

Figure 1:
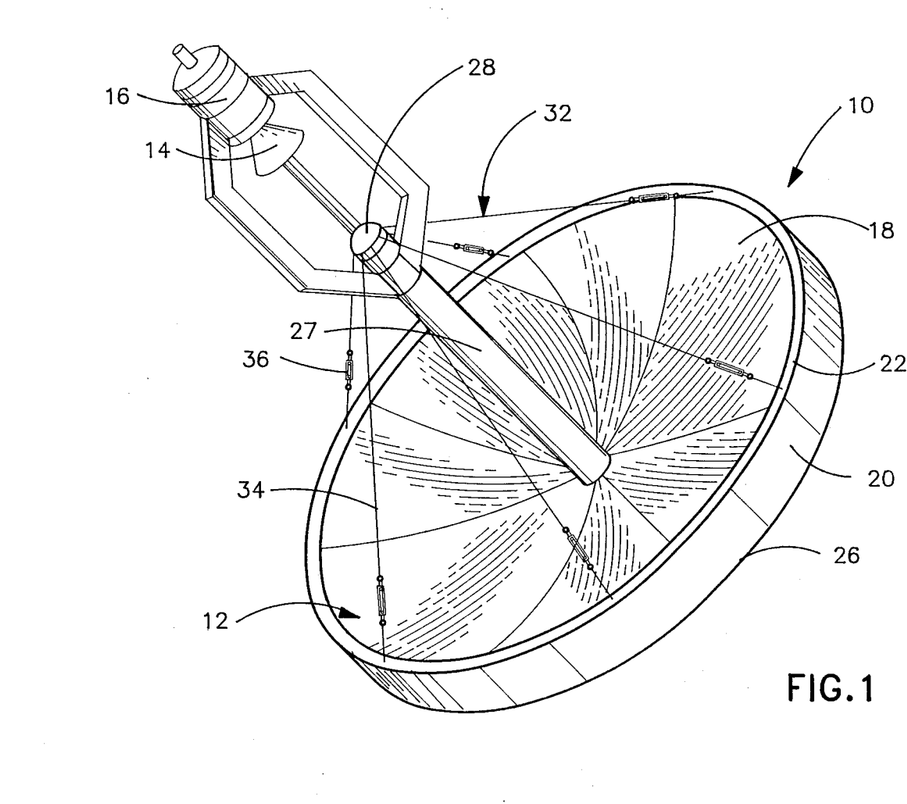
FIG. 1 is a front perspective view of a solar energy receiver device constructed in accordance with the principles of the present invention.
Figure 2:
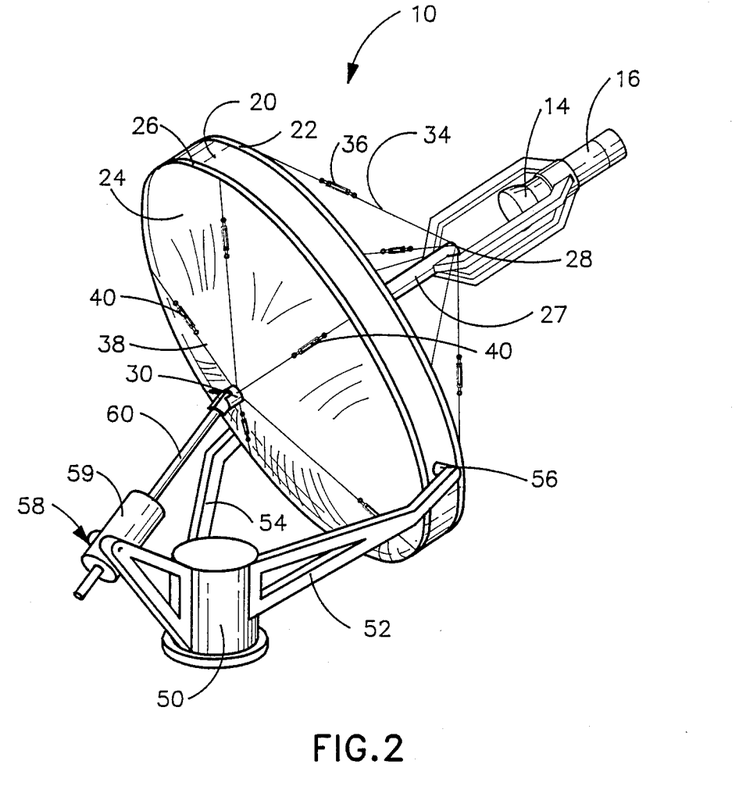
FIG. 2 is a rear perspective view of a solar energy receiving and concentrating device constructed in accordance with the principles of the present invention.
Figure 3:
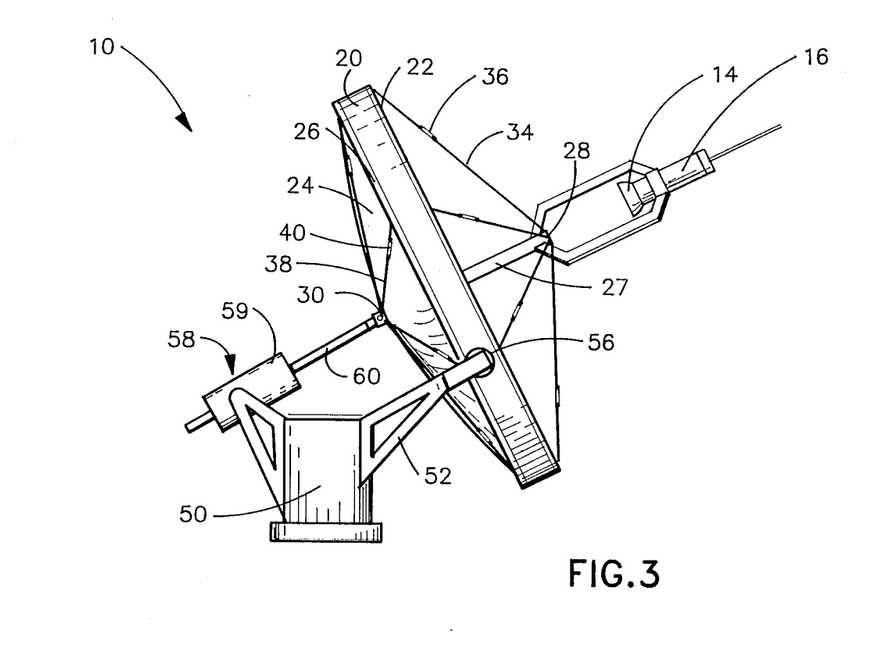
FIG. 3 is a side schematic view of the device illustrated in FIG. 2.

Referring to FIGS. 1-3, a solar energy collector or receiver mechanism 10 is illustrated. The mechanism 10 includes a solar collector or concentrator dish 12 adapted for receiving solar energy in the form of sun rays and reflecting it to a secondary solar energy concentrator of some sort. In the illustrated embodiment, the collector 12 is in the form of a parabolic dish adapted to reflect and concentrate solar energy to a focal point wherein a secondary concentrator 14 is provided to further concentrate the solar energy and convert the same to alternate forms of energy utilizing a convertor 16, for example. Alternatively, as absorber and heat engine may be placed in position in lieu of concentrator 14 and convertor 16. The secondary concentrator 14 and the convertor 16 may of be any typical design available in the art and will not be discussed in any further detail.

In preferred form, the concentrator 12 includes a stretched membrane 18 which is constructed from any know polymeric or metal composite structural material. In preferred form, a flexible polymeric material having a silver reflector surface is utilized. Stretched membrane technology has been developed and is well known in the art, and any known stretched membrane material or construction may be utilized with the present invention. Consequently, further details of such membrane structure will not be discussed herein.

The membrane 18 is secured at its outer perimeter to a frame 20, preferably in the form of an annular ring. In preferred form, the membrane 18 is integrally secured at the upper or outermost peripheral edge 22 of the frame 20. While a single membrane 18 may be utilized with the invention, as can be seen from FIG. 2, a second membrane 24 may be secured to the frame 20 at the inner or rearward circumferential edge 26 thereof. In this manner, the membranes 18 and 24 are spaced apart so as to permit a zone behind the reflector membrane 18 which can hold a partial vacuum, the zone being the space between the membranes 18 and 24 and the frame 20. This assists in maintaining a collector shape in accordance with principles known and existing in the art.

A center post or rod 27 is provided and extends entirely through the membrane 18 at the center thereof. In preferred form, the rod or post 27 extends along an axis substantially perpendicular to the plane of the peripheral edge 22. For purposes of this specification, the plane of the frame 20 will be defined as a plane which incorporates the circumferential edge 22. The post 27 projects outwardly from the front face of the membrane 18 and terminates in a distal end 28. Likewise, the post 27 projects entirely through the membrane 18 and the membrane 24, if the second membrane 24 is in existence, and terminates in a rear or base end 30 which extends rearwardly from the back surface of the frame 20 and membrane 18. The secondary concentrator 14 and convertor 16 are carried at the distal end 28. Consequently, in this arrangement the post 27 must be of substantial strength in order to carry the secondary concentrator 14 and convertor 16 at the free or distal end 28 thereof.

In order to provide strength through the post 27 and the frame 20, as well as to provide tuning or adjustment of the stretched membrane 18, a variable tension mechanism 32 is provided interconnecting the post 27 with the frame 20. The basic objective is to support the membrane 18 without distorting it. In one preferred form, the variable tension assembly 32 includes a first variable tension mechanism in the form of a plurality of cables 34 having turnbuckles or other types of tightening tensioning mechanism 36 attached thereto. The cables 34 interconnect the distal end 28 of the post 27 with the front peripheral edge 22 of the frame 20. The cables 34 attach to the peripheral edge 22 at the juncture of the stretched membrane 18.

In one embodiment of the invention as illustrated in FIGS. 2 and 3, a second set of cables 38 having tensioning mechanisms 40 such as turnbuckles and the like, interconnect the base end 30 of the post 27 with the rear peripheral edge 26 of the frame 20. In this manner, the frame 20 as well as the stretched membrane 18 may be tensioned selectively by adjusting the tension of the various cables 34 and 38. Consequently, the membrane 18 may be fine tuned similar to the tuning of a wheel by adjusting the tension of spokes, the post 27 functioning in the capacity of an axle in this comparison. By fine tuning the membrane 18, the focal point of the parabolic dish form illustrated in FIG. 1 of the membrane 18 may be adjusted to provide maximum optical efficiency in reflecting the sun's rays from the membrane 18 onto the secondary concentrator 14. Since the integrated cable, membrane, frame structure combination is very efficient, all of the weights can be quite low and the frame 20 in conjunction with the cables 34 and 38 make for a relatively light-weight structural support for the collector device 10.

In order to support the frame 20 and the various mechanisms associated therewith, and to provide both elevational and azimuthal positioning to track the sun and maneuver the device 10, a base assembly 50 is provided. In preferred form, the base assembly 50 is in the form of a low height revolving cylinder which permits azimuthal tracking. The base 50 includes a pair of connecting arms 52, 54 which extend therefrom and pivotally interconnect to the frame 20 at pivot connection points 56. The pivot connection points 56 may be of any desired construction and define an axis therebetween around which the ring frame 20 may then be pivoted to provide elevational positioning of the device 10. Rotation about the axis defined between the pivot points 56 is preferably provided by an elevation mechanism 58. In preferred form, the elevation mechanism 58 includes a jack screw 59 and adjustable arm 60 interconnected between the base 50 and an the base end 30 of the post 27. In this manner, by adjusting the length of the arm 60 of the jack screw 59, the post 27 and the frame 20 attached thereto may be pivoted about the axis defined between the pivots 56. In this manner, the elevational positioning of the device 10 may be adjusted to track the sun's path in the sky in conjunction with rotation of the base 50.

The advantages of the cable-stabilized, center-post ring frame combination is that the center post 27 and cables 34, 38 offer both in-plane and out-of-plane stiffening for the frame 20 onto which the optical membrane 18 is attached. This relatively high stiffness system allows the reflector surface to very effectively maintain its original shape, which is quite important from an optical accuracy perspective. The cables 34, 38 themselves are very light in weight, low in cost, and very efficient tensile adjustment structures. By providing increased stiffness and structural efficiency to the frame 20, its weight can be significantly lowered. Since the frame 20 is the most robust element in this stretched membrane concentrator concept, weight reduction and structural efficiency lead to overall concentrator weight and cost reductions. Furthermore, the cables 34, 38 can also be used to help align or "tune" the frame for optical purposes, as described above, much like the spokes are used to align a bicycle wheel. Finally, the cables 34, 38 provide for stiffening of the post 27 which is a significant issue with parabolic dishes wherein a heavy solar concentrator and/or engine, such as the secondary concentrator 14 and convertor 16 of FIGS. 1 and 3, is often placed at the very distal end of the post 27. Thus, the cable stiffened center post, frame concept provides a tightly integrated, highly efficient, and low cost concentrator structure.

Figure 4:
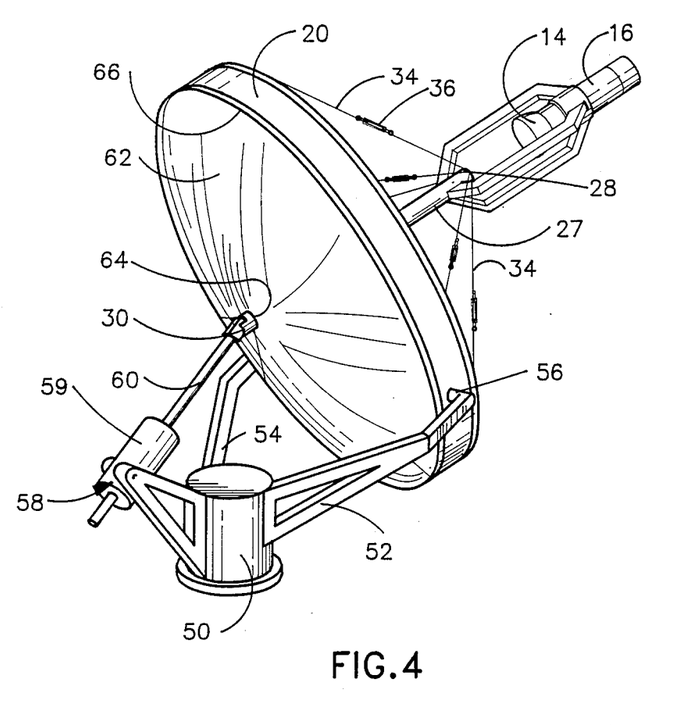
FIG. 4 is a rear perspective view of a modified embodiment of the solar energy receiving and concentrating device of the present invention.

Referring now to FIG. 4, an alternate embodiment of the invention is provided wherein a conical-shaped membrane 62 is secured between the rear peripheral edge 27 of the frame 20 and the base end 30 of the post 27. The conical membrane 62 is secured so that its narrow opening 64 is attached to the base end 30 of the post 27 while its enlarged conical opening 66 is attached along the peripheral edge 26. The conical-shaped membrane 62 balances the load on the reflector membrane 18 in cooperation with the first set of cables 34 much like that of the prior embodiment. However, in this particular embodiment the membrane 62 is utilized instead of a second set of cables. The membrane 62 also functions as the second membrane 24 in the prior embodiment so as to provide a partial vacuum space between the membrane 62 and the reflector membrane 18. In this manner, the membrane 62 serves a dual function.

As can be seen from the above, a highly efficient, low weight and low cost support and maneuvering structure for a solar energy receiver is provided. The advantages of the integrated support and tracking concept of the present invention are numerous. The integrated support is important because it utilizes to the best advantage the annular frame, along with a rotating base, which is considerably stiffened by both front and back membranes, the tensile cables, and the center-post support. This approach basically eliminates the need for three or more large cantilevered truss-frame supports which are typically used on prior art heliostats and/or parabolic dishes. The support trusses in conventional dish concentrators are essentially replaced by the two short fixed arms 52, 54 on the rotating base, the stiffened ring frame, and the bottom end of the center post, all of which provide a triad support system for the present invention. The jack screw arrangement as illustrated above connects the rotating base to the bottom of the center post and provides elevation changes. Consequently, the present invention is simple to operate, low in cost to construct, low in weight, yet exceptionally strong so as to readily withstand environmental stresses. Moreover, the present invention enables the use of low cost stretched membrane concepts in an efficient and effective manner by avoiding the use of expensive, bulky support systems as in prior designs.

The foregoing is considered as illustrative only of the principles of the invention. Further, since numerous modifications and changes may readily occur to those skilled in the art, it is not desired to limit the invention to the exact construction and operation as shown and described, and accordingly all suitable modifications and equivalents may be resorted to within the scope of the invention as defined by the claims which follow except as precluded by the prior art.

The embodiments of the invention in which an exclusive property or privilege is claimed are as follows:

1. Support and maneuvering apparatus for solar energy receiving means for receiving and concentrating solar energy and having a central axis extending through the center thereof, said apparatus comprising:

frame means for mounting the perimeter of said solar energy receiving means and having front and rear perimeter edges;

a support member extending along the central axis of said receiving means and having a base end passing through the center portion of said receiving means and an outer distal end adapted for carrying solar energy receiving and conversion means;

first variable tension means interconnecting the distal end of said support member with said frame means and second variable tension means for interconnecting the base end of said support member with said frame means, said first and second variable tension means providing stiffening for said support member and said frame means and assisting in the alignment of said frame means to optimize the optical efficiency of said solar energy receiving means; and wherein said frame means comprises a pair of spaced stretched membranes mounted integrally therewith for receiving said solar energy, a position and tension of a first one of said pair of spaced stretched membranes being maintained by said first variable tension means, and a position and tension of the remaining stretched membrane being maintained by said second variable tension means;

a rotatable base member;

connecting means extending from said base member for pivotable attachment to said frame means at spaced positions therealong; and elevation means connected to said receiving means for selectively pivoting said receiving means about an axis defined between the attachment positions of said connecting means.

2. The apparatus as claimed in claim 1, wherein said frame means comprises a ring member integral with and supporting said solar energy receiving means.

3. The support and maneuvering apparatus as claimed in claim 1, wherein said support member comprises an elongated post having its base end extending through said receiving means and secured for movement to said elevation means.

4. The apparatus as claimed in claim 1, wherein said first variable tension means comprises a first set of a plurality of adjustable cables secured between the front edge of said frame means and the distal end of said support member, said cables being substantially equally spaced about the perimeter of said frame means.

5. The apparatus as claimed in claim 4, wherein said second variable tension means comprises a second set of a plurality of adjustable cables secured between the base end of said support member and the rear edge of said frame means, said second plurality of cables being generally equally spaced about the perimeter of said frame means.

6. The apparatus as claimed in claim 5, wherein said cables include means to vary the tension of said cables to align said frame means and selectively tighten the surface of said solar energy receiving means.

7. The apparatus as claimed in claim 1, wherein said solar energy receiving means comprises a stretched membrane parabolic dish concentrator, said membrane being mounted integrally to and maintained in firm position by said frame means.

8. The apparatus as claimed in claim 1, wherein said connecting means comprises a pair of connecting arms extending from said rotatable base member and pivotally connected to said frame means to provide elevational adjustment of said frame means along the axis defined by the connection points of said connecting arms to said frame means, said connecting arms and said elevation means providing a triad connection for supporting and maneuvering said frame means in elevation adjustment with the rotation of said base member providing maneuvering of said frame means in azimuthal adjustment.

9. The apparatus as claimed in claim 8, wherein said elevation means comprises a variable length adjustment member interconnecting said frame means with said base member, and means for adjusting the length of said member to pivot said frame means along the axis defined by said connecting arms.

10. Support and maneuvering apparatus for solar energy receiving means for receiving and concentrating solar energy and having a central axis extending through the center thereof, said apparatus comprising:
frame means for mounting the perimeter of said solar energy receiving means and having front and rear perimeter edges;
a support member extending along the central axis of said receiving means and having a base end passing through the center portion of said receiving means and an outer distal end adapted for carrying solar energy receiving and conversion means;
first variable tension means interconnecting the distal end of said support member with said frame means and second variable tension means for interconnecting the base end of said support member with said frame means, said first and second variable tension means providing stiffening for said support member and said frame means and assisting in the alignment of said frame means to optimize the optical efficiency of said solar energy receiving means;
a rotatable base member;
connecting means extending from said base member for pivotable attachment to said frame means at spaced positions therealong;
elevation means connected to said receiving means for selectively pivoting said receiving means about an axis defined between the attachment positions of said connecting means; and
wherein said first variable tension means comprises a first set of a plurality of adjustable cables secured between the front edge of said frame means and the distal end of said support member, said cables being substantially equally spaced about the perimeter of said frame means; and wherein
wherein said second variable tension means comprises a substantially conical-shaped membrane firmly secured at its narrow end to the base end of said support member and at its conical end to the rear edge of said frame means, said conical-shaped membrane balancing the load on said receiving means in cooperation with said first set of adjustable cables.

11. Support and maneuvering apparatus for solar energy receiving means for receiving and concentrating solar energy and having a central axis extending through the center thereof, said apparatus comprising:
frame means for mounting the perimeter of said solar energy receiving means and having front and rear perimeter edges;
a support member extending along the central axis of said receiving means and having a base end passing through the center portion of said receiving means and an outer distal end adapted for carrying solar energy receiving and conversion means;
first variable tension means interconnecting the distal end of said support member with said frame means and second variable tension means for interconnecting the base end of said support member with said frame means, said first and second variable tension means providing stiffening for said support member and said frame means and assisting in the alignment of said frame means to optimize the optical efficiency of said solar energy receiving means;
a rotatable base member; and
wherein said solar energy receiving means comprises a stretched membrane parabolic dish concentrator, said membrane being mounted integrally to and maintained in firm position by said frame means; and
wherein said frame means comprises a ring member, and wherein said parabolic dish concentrator comprises a pair of stretched membranes with each mounted to one perimeter edge of said ring member, said membranes being maintained in spaced relationship by said ring member, and the position and tension of said first stretched membrane being maintained by said first variable tension means, and the position and tension of said second stretched membrane being maintained by said second variable tension means.

12. A support and tracking device for a stretched membrane solar reflector having a front face adapted to receive and concentrate solar energy, said device comprising:

a substantially annular frame having front and rear circumferential edges and adapted for mounting said stretched membrane thereacross;

a support rod aligned along the central axis of said frame and passing through the center of said membrane, said rod having a front distal end spaced outwardly from the front face of said reflector membrane and a base end spaced rearwardly from the opposite rear surface of said reflector membrane;

variable tension means interconnecting said rod with said annular frame to provide tension adjustment to said membrane to optimize the structural and optical efficiency thereof; and wherein said annular frame comprises a pair of spaced stretched membranes mounted integrally therewith for receiving said solar energy, and tension and adjustment for a first one of said pair of stretched membranes being provided by the first variable tension assembly, and tension and adjustment for the remaining stretched membrane being provided by the second variable tension adjustment;

rotatable base member for providing azimuthal adjustment for said device;

connecting means extending from said base member to said frame to provide pivotal movement along an axis defined by the connection of said connecting means with said frame; and elevation means adapted to pivot said device along said pivotal axis to provide elevational adjustment for said device.

13. The device as claimed in claim 12, wherein said variable tension means comprises first and second tension assemblies interconnecting, respectively, the distal and base ends of said rod with said annular frame, and first and second variable tension assemblies each comprising a set of a plurality of adjustable cables.

14. The device as claimed in claim 12, wherein said elevation means interconnects said rotatable base member to said base end of said rod, said elevation means comprising a variable length member adapted to pivot said device along said pivotal axis.

15. A support and tracking device for a stretched membrane solar reflector having a front face adapted to receive and concentrate solar energy, said device comprising:

a substantially annular frame having front and rear circumferential edges and adapted for mounting said stretched membrane thereacross;

a support rod aligned along the central axis of said frame and passing through the center of said membrane, said rod having a front distal end spaced outwardly from the front face of said reflector membrane and a base end spaced rearwardly from the opposite rear surface of said reflector membrane;

variable tension means interconnecting said rod with said annular frame to provide tension adjustment to said membrane to optimize the structural and optical efficiency thereof;

rotatable base member for providing azimuthal adjustment for said device;

connecting means extending from said base member to said frame to provide pivotal movement along an axis defined by the connection of said connection means with said frame;

elevation means adapted to pivot said device along said pivotal axis to provide elevational adjustment for said device; and wherein said variable tension means comprises first and second variable tension assemblies interconnecting, respectively, the distal and base ends of said rod with said annular frame, said first variable tension assembly comprising a plurality of cables interconnecting the distal end of said rod to said annular frame, and said second variable tension assembly comprising a substantially conical-shaped membrane firmly secured first at its narrow end to said base end of said rod and second at its conical end to said annular frame, said conical-shaped membrane balancing the load on said solar reflector in cooperation with said plurality of adjustable cables.

16. A support and tracking device for a stretched membrane solar reflector having a front face adapted to receive and concentrate solar energy, said device comprising:

a substantially annular frame having front and rear circumferential edges and adapted for mounting said stretched membrane thereacross;

a support rod aligned along the central axis of said frame and passing through the center of said membrane, said rod having a front distal end spaced outwardly from the front face of said reflector membrane and a base end spaced rearwardly from the opposite rear surface of said reflector membrane;

variable tension means interconnecting said rod with said annular frame to provide tension adjustment to said membrane to optimize the structural and optical efficiency thereof;

rotatable base member for providing azimuthal adjustment for said device;

connecting means extending from said base member to said frame to provide pivotal movement along an axis defined by the connection of said connecting means with said frame;

elevation means adapted to pivot said device along said pivotal axis to provide elevational adjustment for said device; and wherein said device includes a pair of spaced stretched membranes connected to said annular frame, each said membrane being connected to a circumferential edge of said frame and being spaced from each other in accordance with the depth of said frame, and wherein said variable tension means comprises first and second variable tension assemblies, said first variable tension assembly providing tension adjustment for one of said spaced membranes, and said second variable tension assembly providing tension adjustment for the second of said spaced membranes.

17. In a solar energy receiver having a stretched membrane concentrator, means for mounting said stretched membrane, a support post extending outwardly from said membrane and including a distal end adapted to carry solar energy conversion means, and a base support structure for providing elevational and azimuthal adjustment for said concentrator to track the path of the sun, the improvement comprising:

an annular frame having front and rear circumferential edges and adapted for mounting said stretched membrane;

variable tension means extending between said support post and said frame for stiffening said post and said frame and for selectively adjusting the tension of said stretched membrane to optimize the structural and optical efficiency thereof; and said base support structure comprising a rotatable base member, a pair of connecting arms secured between said base member and said frame, and means secured to said base member for selectively pivoting said frame along an axis defined by the attachment positions of said connecting arms to said frame; and wherein said variable tension means comprises a first variable tension assembly interconnecting the distal end of said post and said frame, and a second variable tension assembly interconnecting said frame with the opposite base end of said post, which base end extends through said membrane and projects beyond the rear surface thereof, said first and second variable tension assemblies providing tension adjustment for said stretched membrane to optimize the optical accuracy and efficiency thereof by tuning said membrane to focus and concentrate solar energy from said membrane to solar energy receiver and conversion means carried at the distal end of said post, and wherein said annular frame comprises a pair of spaced stretched membranes mounted integrally thereto for receiving said solar energy, a tension adjustment for a first one of said pair of stretched membranes being provided by said first variable tension assembly, and a tension adjustment for the remaining stretched membrane being provided by said second variable tension assembly.

18. The improvement of claim 17, wherein said first and second variable tension assemblies each comprises a plurality of adjustable cables.

19. The improvement of claim 18, wherein said frame pivoting means comprises a variable length adjustment member secured between said base member and the base end of said post and adapted for adjusting the elevational position of said device by varying the length thereof.

* * * * *